Patented Mar. 7, 1933

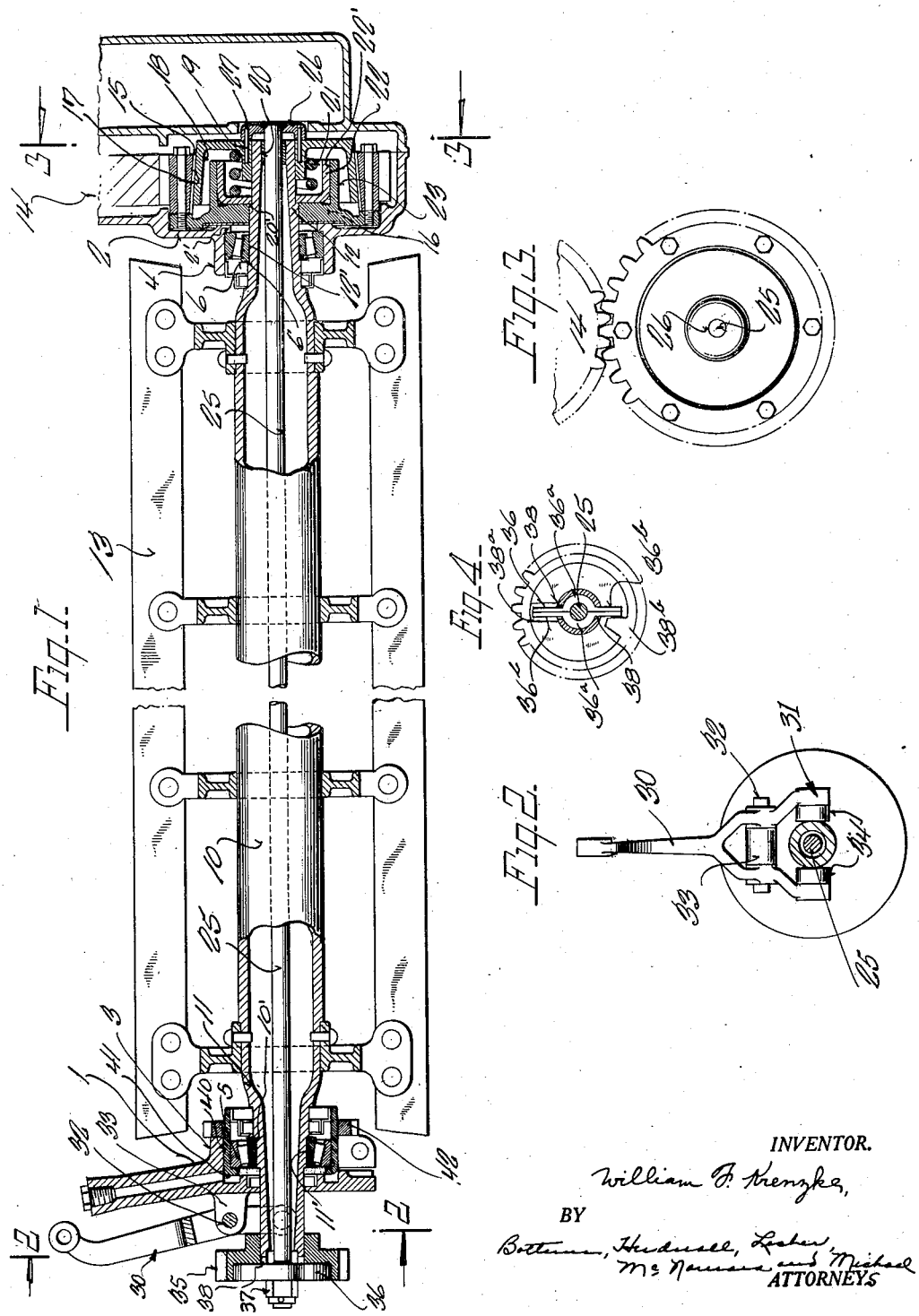

1,900,062

UNITED STATES PATENT OFFICE

WILLIAM F. KRENZKE, OF RACINE, WISCONSIN, ASSIGNOR TO JACOBSEN MANUFACTURING CO., OF RACINE, WISCONSIN, A CORPORATION OF WISCONSIN

POWER MOWER

Application filed August 24, 1931. Serial No. 558,883.

This invention relates in general to mowers and more particularly to a cutter reel mounting and drive especially designed and adapted for power mowers.

In one type of power mower construction, as for example, the type shown in Dremel Patent 1,452,730, granted April 24, 1923, or in Dremel Patent 1,703,521, granted February 26, 1929, the clutch employed for regulating the drive of the cutting reel is thrown in and out by shifting the cutting reel shaft longitudinally. This type of construction has a number of disadvantages. For example, it makes it impossible to use roller or anti-friction bearings, the sliding movement of the cutting reel shaft requiring bronzed bearings.

One of the principal objects of the present invention is to provide a mower with a cutting reel mounting and clutch control drive which is very compactly and closely organized and yet so constituted as to provide anti-friction or roller bearings for supporting the cutting reel shaft for rotation and to embody a simple and effective means for throwing the clutch in the drive of the cutting reel in and out without necessitating sliding of the cutting reel shaft.

In carrying out the present invention, the cutting reel shaft is made hollow and is supported for rotation although held against axial movement by roller bearing assemblies mounted on the side frame members of the mower. One end of the hollow cutting reel shaft has a movable clutch member mounted thereon and constrained to rotate therewith although free to move axially for a sufficient extent to provide for clutching and unclutching. This movable clutch member is cooperable with a clutch member incorporated in a driving gear of the transmission between the power plant and the cutting reel shaft and both the drive gear and its clutch member are freely rotatable relative to the cutting reel shaft. A spring is used to bias the movable clutch member into engagement with the cooperable clutch member of the gear wheel. For throwing out the clutch a shifting rod is connected to the movable clutch member and extends through the hollow cutting reel shaft from the end to which the clutch is mounted to the opposite end. At the opposite end, the shifter rod is interconnected with an operating lever. By pulling on the operating lever in one direction the rod is shifted to disengage the clutch. Release of the operating lever permits the rod and movable clutch member to shift sufficiently under the influence of the biasing spring to engage the clutch.

With this construction a very close, simple and compact structural organization is had, the cutting reel shaft has a smooth and free running mounting in the anti-friction bearings and is constrained against axial movement, and the structure of the mower is, in general, simplified and improved.

Another advantageous feature of the organization is that the roller bearing assemblies are so organized with the frame members of the mower and with the cutting reel shaft and are themselves so constituted that the bearing assemblies may be properly loaded and may be taken up when wear occurs by adjusting a single adjusting member.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a fragmentary view partly in longitudinal section and partly in elevation and illustrating a cutting reel of the power mower together with its mounting and its clutch control drive;

Figure 2 is a view in transverse section taken on line 2—2 of Figure 1;

Figure 3 is a similar view taken on line 3—3 of Figure 1; and

Figure 4 is a view in end elevation looking toward the right in Figure 1.

Referring to the drawing, the numerals 1 and 2 designate portions of the side frame members of the mower formed with flanged bearing supports 3 and 4 of annular form in which roller bearing assemblies 5 and 6 are fitted. A hollow cutting reel shaft 10 is provided and has stepped end portions 11 and 12, the end portion 11 having one of its steps 11' interfitted with and secured to the inner race member of roller bearing assembly 5 while the end portion 12 has one of its steps 12' interfitted with and secured to the inner race member of roller bearing assembly 6. The usual cutting reel 13 is carried by and rotated with the cutting reel shaft 10.

The cutting reel shaft 10 is driven from the power plant (not shown) of the mower through a gear train or transmission including gears 14 and 15, the gear wheel 14 being connected up in any suitable manner to the power plant and driven thereby and the gear wheel 15 having its side plate or body portion 16 loosely mounted on the stepped end 12 of the cutting reel shaft. Between this gear wheel 16 and the cutting reel shaft a manually operable clutch is provided and may comprise a clutch member 17 formed on the interior of the gear wheel 15 and a cooperable clutch member 18 having its hub 19 slidably fitted on the squared step 20 at the extreme end of shaft 10. The clutch members 17 and 18 are preferably of the cone type and are engaged when the inner movable clutch member 18 is forced to the right as viewed in Figure 1 under the influence of clutch spring 21, one end of which engages the body portion of the clutch member 18 and the other end of which is seated in a spring cup 22 housed in an annular flange 23 formed integral with the side plate 16 of the gear wheel 15.

The gear wheel 15 with its side plate or body portion 16 is loosely mounted on the cutting reel shaft. Actually, its rotative bearing is had through the engagement of its flange 23 with the surface 22' which is the outside perimeter of the spring or clutch cup 22 mounted on the square part of the reel shaft, rather than on the reel shaft itself. The clutch cup is constrained in its movement to the left by the shoulder 20' on the reel shaft. Consequently, when the clutch is disengaged, the clutch member 18 is moved to the left against the action of the spring, and the clutch cup against the shoulder 20' absorbs the thrust of the spring. The gear wheel and side plate, 15 and 16, merely float in their positions, there being a slight running clearance between the side plate 16 and the clutch cup. On engaging the clutch, the spring forces the clutch member 18 to the right into contact with the gear wheel 15 and the thrust is transmitted through this to the side plate 16. Side plate 16 then comes into contact with the reverse side of the clutch cup and is constrained from further movement by the equal and opposite spring thrust. In this way, it will be seen that the entire spring thrust is self contained between the clutch member 18, gear wheel 15, and side plate 16 and the clutch cup. Until full clutch contact has been established, there is relative motion between clutch member 18 and gear wheel 15 and consequently between side plate 16 and the clutch cup, but this ceases and all parts rotate as a single unit when full contact has been established.

In order to provide for disengagement of the clutch and hence allow the cutting reel to idle a shifting or operating rod 25 is extended through the hollow cutting reel shaft 10 and projects beyond the ends thereof. The projecting end of the rod 25 adjacent the clutch has a flanged coupling and abutment plate 26 welded or otherwise suitably secured thereto and of such size as to overlap the hub of the inner clutch member 18. Fastening devices 27 secure the coupling plate 26 to the hub 19 of the inner clutch member. With this construction, when the rod 25 is moved to the left as viewed in Figure 1, the flange of the coupling plate 26 will slide over the adjacent end of the shaft 10 and pull the inner clutch member 18 to the left to disengage it from its outer clutch member.

For shifting the rod 25 to the left against the action of the spring 21, an operating lever 30 is provided and has a forked or bifurcated end 31 fulcrumed as at 32 on a bracket 33 integral with the side frame member 1. The bifurcated end of the lever also carries rollers 34 which bear against one face of a gear wheel 35. The gear wheel 35 is interconnected with the cutting reel shaft 10 and with the shifter rod 25 by a key designated generally at 36.

To facilitate its manufacture the key 36 is made of two similar sections, each of which has a semi-circular hub portion 36ª and laterally projecting end portions 36ᵇ. The sections are fitted together as shown in Figure 4 in the assembly and function as a single piece, the semi-circular hub portion 36ª loosely surrounding the rod 25 and the end portions 36ᵇ extending through slots 38 in the end of the reel shaft 10 and projecting beyond the slots and into engagement with a recess 38ª or a lug 38ᵇ. A castellated nut 37 is threaded on the end of the rod 25 which projects beyond the key 36 and is engageable with the hub portion of the key. The nut 37 serves as a means for adjusting the amount of thrust for the clutch and to compensate for wear. As nut 37 is tightened the play between the key 36 and the gear 35 is taken up and the full movement of lever 30 is transmitted to the rod 25. Loosening the nut 37 has a reverse effect. The adjustment is such, however, that the gear 35 and key 36 are allowed sufficient freedom for lateral movement to permit the clutch to be effectively engaged under the full force of the spring 21 when the clutch is thrown in. This gear wheel 35 is utilized for reversing the mower for sharpening and coacts with gearing for this purpose in a well known manner. For the purposes of the present invention this function may be ignored and it may be regarded as a collar or plate which takes the thrust or operating force when the lever 31 is manipulated and transmits the clutch operating motion through the key 36 to the shifting rod 25.

Another advantageous feature of the organization is that both roller bearing assemblies may be adjusted or taken up by adjusting a single adjusting member. For this purpose the roller bearing assembly 5 has its inner race member tightly secured to the step 11' and one end of said race member abuts the shoulder 10' on the shaft 10. The outer race member is fitted in a bearing cup 40 and is engaged at one end by an inwardly directed annular flange 41 on said cup. For a part of its length the outer periphery of the cup is threaded and projects beyond bearing support 3. The threaded projecting portion of cup 40 has an adjusting ring 42 threaded thereon. The adjusting ring 42 abuts the end of the flanged bearing support 3 and when turned up against the flange will pull the cup 40 to the right as viewed in Figure 1. Now since the other bearing assembly 6 has its outer race member abutting a flange 2' on the frame member 2 and its inner race member abutting a shoulder 6' adjacent the step 12', the adjustment of the ring 42 just described will appropriately load the bearings and take up undesirable lost motion. Considering the action more in detail it will be seen that when the adjusting ring 42 is turned to pull the cup 40 to the right the flange 41 of the cup will pull the outer race member of the bearing 5 to the right as viewed in Figure 1 and thus tend to properly load the bearing assembly 5. Further adjustment of this character will result in the inner race member of bearing assembly 5 exerting a thrust to the right as viewed in Figure 1 on the shaft 10. This motion of the shaft is transmitted to the inner race member of the bearing assembly 6 and since the outer race member is held against such movement by the shoulder 2' the bearing assembly 6 will be properly loaded or adjusted from the ring 42.

The invention claimed is:

1. In a mower having side frame members, anti-friction bearing assemblies carried by said side frame member, a hollow cutting reel shaft journaled in said bearing assemblies, a cutting reel carried by said shaft, a drive for the cutting reel, a clutch between the drive and one end of the cutting reel shaft, and means for controlling the engagement and disengagement of the clutch and including a shifter rod extending through the hollow shaft, a connection between one end of the shifting rod and the clutch, and a lever for shifting said rod.

2. In a mower having side frame members, anti-friction bearings carried by said side frame members, a hollow cutting reel shaft journaled in said bearings, a cutting reel on said shaft, a drive for the cutting reel including a gear wheel loosely mounted on one end of the shaft and having an internal clutch member, a cooperable clutch member slidable on the shaft but constrained to rotate therewith, a clutch spring between said members for biasing them into clutching engagement, and means for controlling the engagement of said members and including a clutch shifting rod extending through the hollow shaft and connected to said cooperable clutch member.

3. In a mower having side frame members, anti-friction bearings carried by said side frame members, a hollow cutting reel shaft journaled in said bearings, a cutting reel on said shaft, a drive for the cutting reel including a gear wheel loosely mounted on one end of the shaft and having an internal clutch member, a cooperable clutch member slidable on the shaft but constrained to rotate therewith, a clutch spring between said members for biasing them into clutching engagement, means for controlling the engagement of said members and including a clutch shifting rod extending through the hollow shaft and projecting at its ends beyond the same, a flanged abutment and coupling plate secured to one end of the rod and having its flange slidably overlapping the adjacent end of the shaft and interconnected with the cooperable clutch member, and means cooperable with the other end of the rod for controlling the shifting thereof.

4. In a mower having side frame members, anti-friction bearings carried by said side frame members, a hollow cutting reel shaft journaled in said bearings, a cutting reel on said shaft, a drive for the cutting reel including a gear wheel loosely mounted on one end of the shaft and having an internal clutch member, a cooperable clutch member slidable on the shaft but constrained to rotate therewith, a clutch spring between said members for biasing them into clutch engagement, means for controlling the engagement of said members and including a clutch shifting rod extending through the hollow shaft and projecting at its ends beyond the same, means connecting one end of the rod with the cooperable clutch member, a clutch operating lever fulcrumed on the frame member remote from the clutch, and means connecting said lever to said rod.

5. In a mower having side frame members, a cutting reel shaft, a cutting reel thereon, annular bearing supports carried by said side frame members and projecting inwardly therefrom, an anti-friction bearing assembly in each of said supports, each anti-friction bearing assembly including inner and outer race members, and interposed anti-friction members, the inner race members of each assembly being secured to said shaft, there being an abutment on one of said bearing supports engaged with the outer race member of one of said assemblies, a flanged cup cooperable with the outer race member of the one assembly, and an adjusting ring threadedly engaged with said cup and abutting the adjacent bearing assembly exteriorly thereof whereby said ring is operable from the exterior to properly load and adjust both of said assemblies.

In witness whereof, I hereto affix my signature.

WILLIAM F. KRENZKE.